June 20, 1933.  J. P. TARBOX  1,914,900
SYSTEM OF CHASSIS LUBRICATION
Filed March 20, 1923     4 Sheets-Sheet 1

INVENTOR
John P. Tarbox

June 20, 1933. J. P. TARBOX 1,914,900
SYSTEM OF CHASSIS LUBRICATION
Filed March 20, 1923 4 Sheets-Sheet 3

INVENTOR
John P. Tarbox

Patented June 20, 1933

1,914,900

UNITED STATES PATENT OFFICE

JOHN P. TARBOX, OF GARDEN CITY, NEW YORK

SYSTEM OF CHASSIS LUBRICATION

Application filed March 20, 1923. Serial No. 626,315.

The field in which my invention lies is that relating particularly to vehicle chassis lubrication, but it may in part at least be applicable to other fields. Its aim is the production of a practical method and apparatus for lubricating a chassis from a central reservoir. The most important of its objects are the attainment of sufficient lubrication of the proper character, which involves the quality, the amount and the periods of the feeding; efficient lubrication, which involves not only thoroughness of distribution at the point of application but economical and unwasteful distribution; cleanliness, which is in some measure an outgrowth of efficiency in lubrication but in other measure is quite independent of it; reliability, which involves accuracy, certainty and regularity of feeding; durability, which involves sturdiness, ruggedness and unfailing power; and simplicity, which involves moderate cost of manufacture and installation and minimum care in operation and maintenance.

Specifically the method consists in feeding from the central source of supply to each point of application under relatively low pressure, but at the points of application feeding in under relatively high pressure a measured quantity of lubricant per unit distance run. The system of organization of parts by which this is carried out comprises the central supply reservoir, a feeding-in control device in the form of a diminutive high pressure pump local to each bearing and adapted to be controlled by lubricant pressure, connections between the feeding-in devices and the reservoir, a means to change the pressure in these connections to operate the feeding-in devices, and speedometer mechanism for the vehicle governing this means to change the pressure in accordance with the number of miles run by the vehicle.

Of the drawings Fig. 1 is a plan view of the chassis of a modern automobile showing in diagram the relation between the central reservoir or source of supply and the bearings or points of application. Rigid tubing is indicated by the full lines and flexible tubing by the dotted lines.

Figure 1:
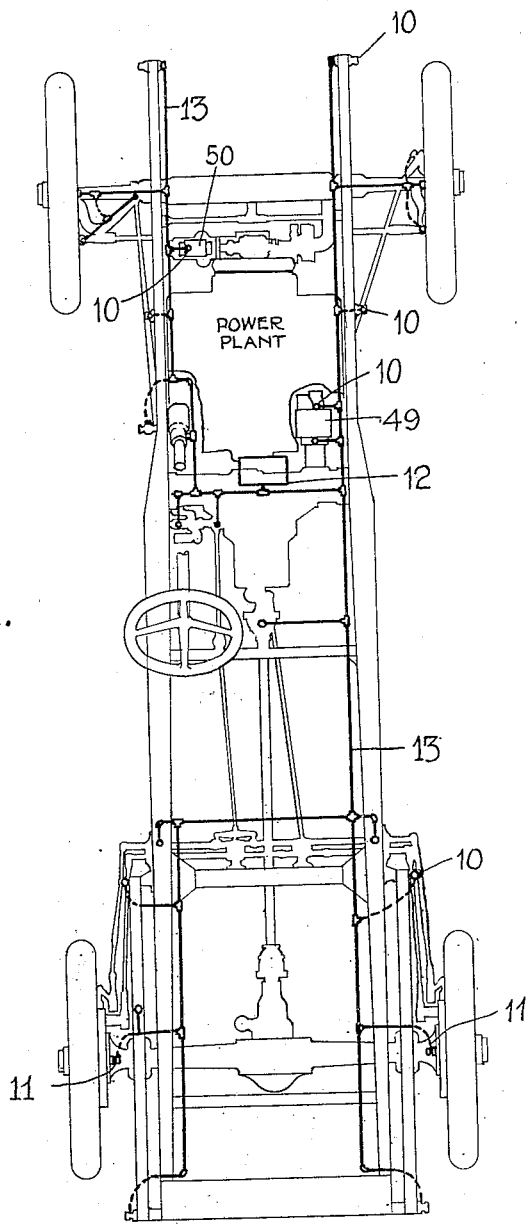

The following is an itemized catalogue of the parts identified by the reference numerals used in the drawings:

10. Certain points of application or bearings to be lubricated. The drawings Fig. 1 indicates the nature of these. The majority of these are bearings of the chassis itself. One or two of them however are bearings of the steering gear and one or two of them bearings of the power plant. The term "power plant" is used in its all inclusive sense, covering all power generating and consuming devices in use on the car.

11. Certain other bearings or points of application of lubrication which for the sake of illustration may be said to require a lubrication different in kind, quality or quantity, from those designated by numeral 10.

12. The central supply reservoir, located under the motor hood, under the dash or at other convenient point remote from the bearings 10, 11, and for convenience in filling. This reservoir constitutes the main source of supply for all of the bearings in common, and lubricant is normally stored therein at atmospheric pressure, though this may be otherwise as will be indicated.

13. Supply mains and laterals constituting connections between the reservoir 12 and the bearings 10 and 11.

Figure 2:
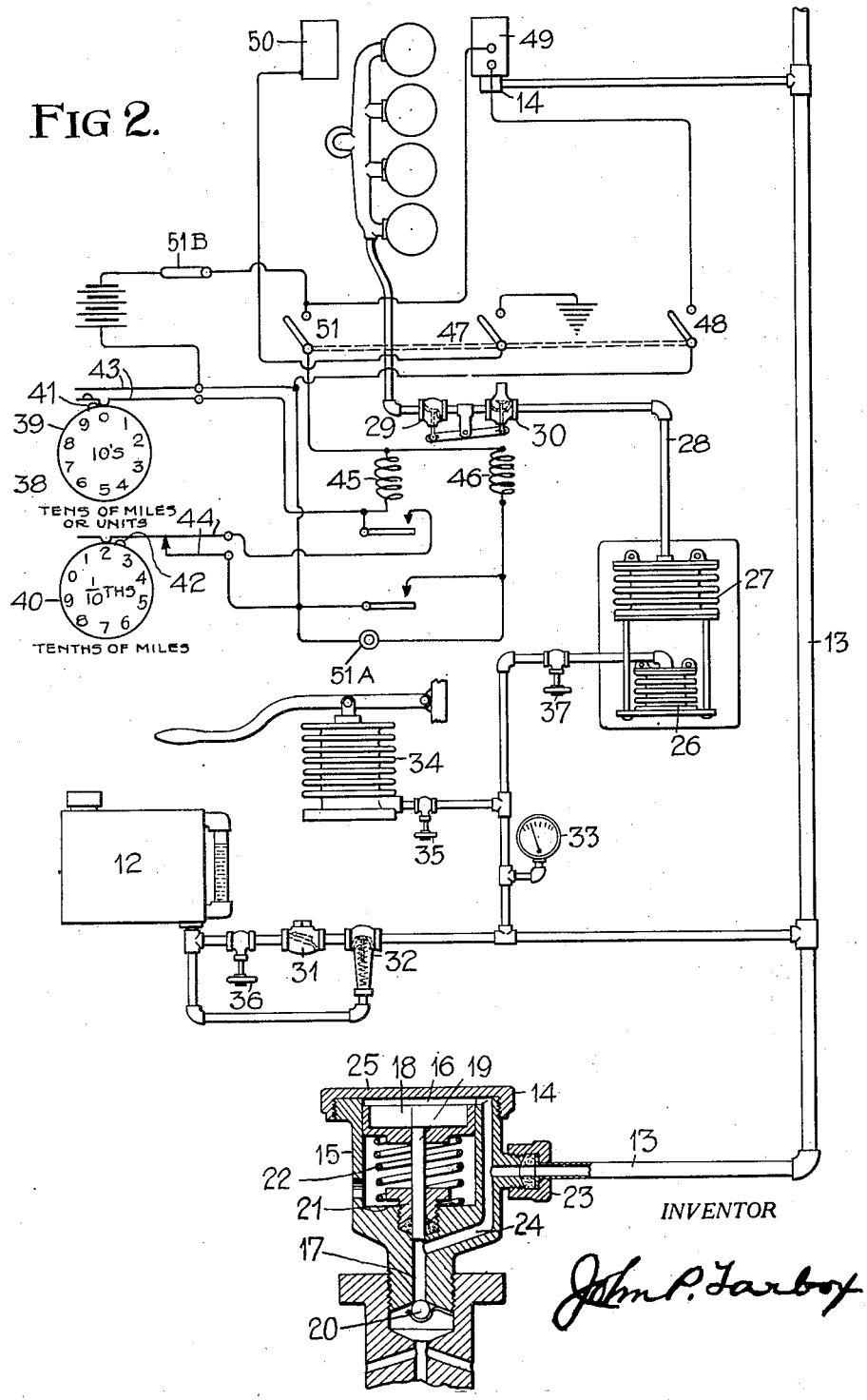
Fig. 2 is a diagram in detail of the principal elements of the system operated by change in lubricant pressure as aforesaid.
Figure 3:
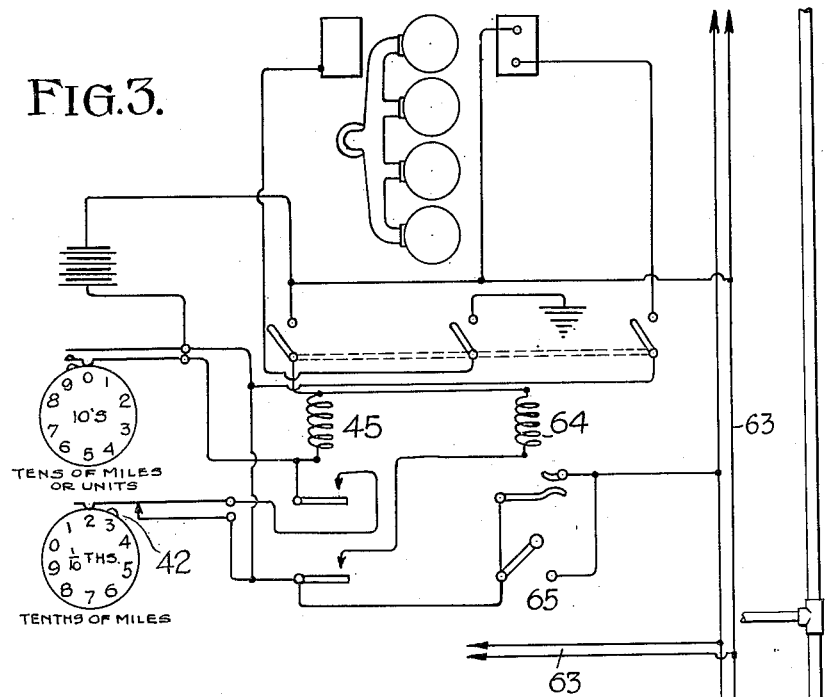
Fig. 3 is a similar diagram of a modification in which the change of pressure is electrical instead of hydraulic as in the lubricant.

14. The feeding-in devices of which there is one local to each bearing and individual thereto. These feeding-in devices are in a form, as shown in Figures 2 and 3, of needle piston pumps, which is to say that the high pressure piston and cylinder are of a diameter comparable with the diameter of a needle and of a capacity sufficient to hold a drop or at most a few drops of lubricant. The over-all dimension of the pumps 14 is small, the main body being intended to be between one-half an inch and one inch in diameter. They are not larger than the small compression grease cups commonly used to lubricate chassis bearings, and are formed much of the same exterior pattern.

15. The body of the pump.
16. The low pressure chamber of the pump embodied in the large or exterior portion of the body.
17. The high pressure chamber of the pump embodied in the small stud portion of the body 15 which portion is secured directly into the bearing in such manner that lubricant discharged from it penetrates directly to the bearing surfaces or other point of application.
18. A large or low pressure piston which is adapted to be reciprocated in the chamber 16.
19. The needle piston which is connected with piston 18 and is reciprocated in needle cylinder 17. This piston is fitted somewhat loosely in chamber 17 as is common in valveless or univalve pumps.
20. The discharge valve of the high pressure pump constituted by needle piston 19 and cylinder 17. This valve is held to its seat by a suitable spring of tension sufficient to prevent discharge of fluid except under action of piston 19 and to prevent return flow of lubricant on return stroke of piston 19. This insures refilling of cylinder 17 by leakage around the loose fitting piston 19.
21. A packing gland surrounding needle pistons 19 intermediate chambers 16 and 17.
22. A compression spring normally holding the pistons in retracted positions shown.
23. A union joining supply conduit 13 with body 15.
24. Passageways formed interiorly of the walls of casing 15 in communication with low pressure chamber 16 above piston 18 when the pistons are in the retracted position shown, and also with chamber 17 below piston 19.
25. The screw cap for the casing 15.
26. A sylphon or other displacement apparatus connected with supply main 13 and adapted when compressed to raise the pressure in the main. This sylphon has one of its end walls fixed to a base as indicated while the other end is free to be moved.
27. A second sylphon also having one end fixed to this base, but having its free end connected to the free end of sylphon 26 when sylphon 27 is itself compressed.
28. A connection from sylphon 27 to the intake manifold of the power plant.
29. A valve controlling the opening and closing of this connection to the manifold.
30. A valve controlling the closing and venting of this connection to atmosphere.
31. A check valve between the reservoir 12 and the main and laterals 13 which prevents the return flow of lubricant to the reservoir.
32. A pressure relief valve outside of the tank from the check valve having a return connection to the tank by passing check valve 31.
33. A pressure gauge connected with the main 13.
34. A hand operated displacement sylphon also connected with the main 13.
35, 36, 37, manually operated cut-off valves between manually operated sylphon 34, main reservoir 12 and power operated sylphon 26 respectively and the main 13.
38. The speedometer of the vehicle indicated diagrammatically by two of its wheels.
39. The wheel by means of which hundreds, tens or units of miles are indicated.
40. The wheel by which tenths of miles is indicated.
41. A projection on the periphery of wheel 39 opposite a unit, a ten or hundred mark.
42. A similar projection opposite an indication of a tenth of a mile following the indication of a unit or ten or hundred mile indication.
43. A pair of normally opened spring contacts one of which has an offset in the path of projection 41 adapted to be momentarily engaged by the same when the wheel 39 is shifted from one indication to another, and when so engaged to effect a closure of the contacts.
44. A pair of normally closed spring contacts, one of which has an offset adapted to be engaged by projection 42 when wheel 40 is moved from one position to another, thereby to effect an opening of contacts 44.
45. A relay whose circuit is closed by contacts 43 and locked temporarily through contacts 44.
46. A magnet whose circuit is controlled by relay 45. This magnet 46 as indicated commonly operates valves 29 and 30 opening 29 when it closes 30 and vice versa.
47, 48. The control switch of the power plant normally located on the dashboard of the vehicle. It is illustrated but diagrammatically.
49. A starting motor (or generator) of the power plant controlled by switch 47, 48.
50. A magneto or other ignition device also controlled by starting switch 47, 48.
51. A circuit closer governing the circuits of relay 45 and control magnet 46, which circuit closer is associated with starting switch 47, 48 for operation simultaneously therewith, as by way of illustration by being mounted on the same pintle or shaft.
51A. A push button switch. 51B. A switch cutout.

The operation is as follows: Once each mile, each ten miles or each hundred miles of travel of the vehicle as may be selected, or any intermediate number of miles for which there may be provided an appropriate wheel 39, contacts 43 are momentarily closed, closing the circuit of relay 45 which in turn locks up thru contacts 44 and energizes magnet 46. This magnet closes normally open vent valve 30 and opens valve 29 placing sylphon 27 in communication with intake manifold of the motor. Sylphon 27 being subjected to the suction of the manifold is collapsed and places pressure on sylphon 26 connected to main 13 and its laterals. Now assuming sylphon 34 to have been cut off by valve 35 (manual operation not being desired at this time) and that check valve 31 prevents return flow of lubricant to reservoir 12, the pressure of main 13 and all its laterals is raised and simultaneously all of the low pressure pistons 18 are actuated suddenly forward and the needle pistons 19 force the charges of cylinders 17 into their respective bearings and onto the bearing surfaces themselves. This takes place more or less suddenly depending upon the power developed in sylphon 27. This power may be small or large as desired by varying the size of the sylphon and appropriately adjusting connection 28 to the intake manifold. Thus each and every bearing on the entire chassis (and any other bearings which may be connected with the system) is given a "shot" of lubricant under high pressure. The slightly raised pressure in the mains 13 while sufficient to operate the pumps 14 is yet a relatively low pressure, the high pressure being developed not through material increase in the main 13 but through the ratio of the areas of low pressure piston 18 and the high pressure needle piston 19. With the diameter of low pressure piston 18 of ¾ of an inch and a diameter of high pressure piston 19 $\frac{1}{16}$ of an inch, the rise in pressure of but five pounds in main 13 and its laterals will generate under piston 19 and in the lubricant forced into the bearing a pressure of approximately 720 pounds per square inch. This pressure it will be noted is generated in and confined to the bearing itself, and as the pump 14 constitutes the last link of the connection from the reservoir to the bearing itself, the connection 13 and its laterals are not subjected to high pressure at any time but on the contrary the lubricant is contained in them at such low pressure as to scarce feed a leak.

This pressure is sustained while the vehicle travels one or more tenths of miles, as in the case illustrated, three-tenths of a mile. Whereupon the circuit of relay 45 is opened at contacts 44 by wheel 40 when it is actuated to the three point indication. This breaks the circuit of magnet 46, sylphon 27 is cut off from the intake manifold and vented to atmosphere, whereupon normal reservoir pressure is restored throughout the system and springs 22 retract the pistons of all the pumps to their normal positions. This retraction in the univalve pump illustrated takes place somewhat more slowly than the forward movement, depending upon the degree of looseness of needle pistons 19 in their cylinders 17. This is immaterial however since the high pressure has been sustained during the period it has taken the car to travel three-tenths of a mile and sufficiently long to distribute lubricant to all surfaces requiring it. The operation is repeated at the regular intervals determined by the chosen setting of wheels 39, 40 and the associated contacts 43, 44.

The method of my invention is carried out fully in these operations, and its advantages fully realized. The supply lines are maintained under relatively low pressure, and through raising that relatively low pressure at intervals proportionate to the distance run a relatively high feeding-in pressure is generated at and confined to the point of application, and each of the lubricated parts of the chassis is fed with a measured quantity of lubricant per unit distance run. The lubricant being forcibly fed in small measured quantities, at intervals proportionate to distance run, and automatically (which is to say with properly built apparatus unfailingly), not only is exhaustion or undue diminution of lubricant a most remote possibility, but each bearing gets precisely that quantity of lubricant which it should have for proper lubrication for the distance run, and wear of the parts is reduced to an absolute minimum consistent with the grade of lubricant used. Well it may be said, a drop a day keeps the wear away.

Figure 4:
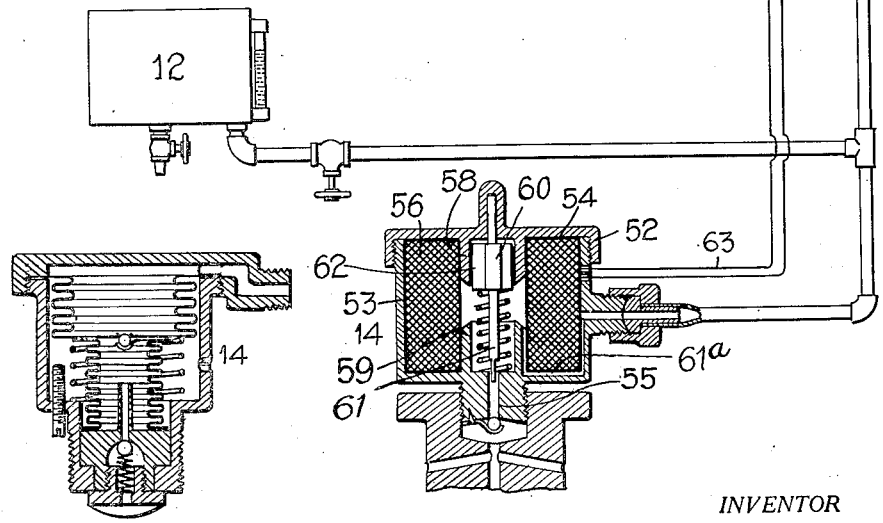
Fig. 4 is a section of a modified form of pump.

Feeding of the precise quantity needful precludes the exuding of lubricant from the bearings and eliminates all of that ugly conglomeration of grease, earth and dirt which so frequently besmirches appearance and always augments wear. By adjusting the sizes of the feeding-in pumps, their variation of relative piston area, length of feeding-in stroke or power, or any of them (and all of them are most simple of choice or adjustment) the measured quantity fed to the bearing may be adjusted precisely to its requirements per unit distance run. So simple an expedient as the provision of a set screw as shown in Fig. 4 will admit adjustment of the throw of the pumps and determine the number of drops forced in. Waste is entirely absent from such a method. It can but be economical.

Moreover as a direct result of this method and its economy a high grade of very fluid lubricant may be used. Such a lubricant has very superior advantages for lubricating bearings in that such lubricant is more promptly and more fully distributed to the surfaces requiring it and also has less tendency to hold foreign material in the bearing and is less subject to retardation of flow and to congealing at low temperatures. Lubrication is this rendered more reliable.

The high forcing-in pressure being generated at and confined to the point of application, indeed confined in the bearing itself, leakage is reduced to a minimum. In fact the only joint in the whole apparatus subject to leakage is the juncture of the feeding-in pump with the bearing. The feeding-in pump is really a part of the bearing itself and may if desired in many cases be formed integrally therewith. Thus is the high pressure applied not to a whole system of distributing connections where it may be dissipated before it reaches the point of application, or indeed misdistributed between several points of application, but applied solely within the particular bearing itself. It is thus rendered certain that each bearing will get the lubricant intended for it. Elimination of high pressure from the connections with the source of supply on its part reduces to a minimum the opportunities for leakage and breakage of these connections. A number of these connections as for example those to shackle bolts need be flexible and the use of low pressure (normally only the head from the supply reservoir itself) greatly reduces the wear upon and prolongs the life of these flexible connections.

The utilization of small change to generate the high feeding-in pressure eliminates the complication of mechanical or electrical mechanism and reduces the system to the least common multiple of simplicity and reliability. A good system of supply connections is well illustrated in Figure 1. The aggregate length of the mains and laterals is small, and almost the entire length consists of fixed tubing which can be made as heavy as desired and is not subject to the wear of motion. The installation of the supply reservoir 12 and the operating sylphons 26, 27 may be in general form similar to the ordinary vacuum fuel feeding equipment. The simplicity of the electrical controls is self-apparent. All may be placed under the dash or the motor hood. Everything once properly installed there is required no attention from the operator of the car except the filling of the lubricant reservoir when the supply is low.

When the car is stopped and the cut out switch 47, 48 is opened the lubricating system is also cut out of operation at switch 51 and all lubricant pressure therefore restored to normal. This prevents waste of either power or lubricant. If a vehicle has stood for a considerable length of time, as for example several weeks, the operator may wish to lubricate the chassis before starting out. This he may do by simply pressing push button 51A for a few moments at a time. Or else he may close valve 37, open valve 35 and operate sylphon 34 to raise the pressure in the mains, simply moving the operating lever up and down one or more times as desired. In fact the electrical control may be cut out at any time by means of switch 51B or by any suitable disconnection, valve 37 permanently closed and lubrication accomplished by the manual operation just described once a day or as otherwise desired. The operator is prevented from raising the pressure too high both by observation of the gauge 33, or the automatic relief valve 32 and its bypass. But the automatic operation is that preferred since it is through this operation that the method of my invention is most assuredly carried out.

In Figure 3 I have shown a modified apparatus suitable for electric control in lieu of the hydraulic control of Figure 2. Those parts bearing similar reference numerals are similar to those of Figure 2 and need not be further listed here. The modified parts are as follows:

52. The feeding-in pumps. These are electrically operated.

53. The body of the pump. This is made of magnetic material.

54. The low pressure chamber of the pump which as in the former case is embodied in the large or exterior portion of the body.

55. The high pressure chamber of the pump similar to the high pressure chamber 17 of the form of Figure 2.

56. A coil winding within the low pressure chamber 54 and substantially filling it.

58, 59. Re-entrant portions of the top and bottom of the body 53 which approach within a fraction of an inch of each other and constitute a part of the interior core of electric magnet.

60. The armature of the electro magnet. This is shown as mounted on a pintle shaft bearing in the top and bottom of the casing and is held normally in a retracted position within the upper re-entrant portion of the casing 58 by a compression spring surrounding the pintle shaft and housed within the lower re-entrant portion.

61. The needle piston operating in the high pressure chamber 55. This piston is constituted by the lower end of the pintle shaft which supports the armature 60. Its lower extremity which always bears in the upper extremity of chamber 55 is flatted on one or more sides so that when the needle piston is in its retracted position lubricant has access along the flatted sides to chamber 55. As in the case of piston 19 it fits somewhat loosely in its chamber.

61a. A clearance or passageway by which lubricant has access by the coil 56 to the central part of the chamber 54.

62. Clearances between the re-entrant portion 58 and the armature 60 admitting free access of lubricant from the under to the top side of the armature 60.

63. Electrical operating connections to the various magnetic pumps 52.

64. An electrical circuit breaker or contactor governing all of the magnets 52 in parallel, which is to say in common, and itself like control magnet 46 of Figure 2 controlled from a relay 45.

65. A manually operable switch in shunt to the control contacts of circuit breaker 64.

The operation of this modification while involving auxiliary circuit 63 is in fact the more simply described for upon energization of circuit breaker 64 thru the automatic control of the speedometer, or upon closure of switch or push button 65 all of the electromagnetic pumps 52 are simultaneously operated each to inject into its own bearing the measured quantity of lubricant which it contains within its high pressure chamber 55, and upon the opening of the contacts of devices 64 or 65 the armatures 60 of the magnetic pumps are retracted and the system restored to normal condition. Except for the fact that electrical connections need parallel the already existing lubricant supply connections and constitute an additional system to be maintained, the electrical system is really simpler and has a less number of parts than the hydraulic system. In fact the degree of this difference is believed to be such that it will be actually cheaper in first installation.

The modifications of which the operation and method of apparatus of my invention are possible without departing in any way from the generic spirit of same are obviously many. I have made a special illustration of the electro-magnetic embodiment. There will be others of equal degree. But the larger in number will be the modifications of detail. A few of the important ones which I have perceived are the following, reference numerals applying to the parts:

12. The source of lubricant supply. This reservoir and supply may be the reservoir and supply of the power plant as for example the crank case, crank case lubricant being used for the chassis as well as the power plant. In such an event the power for raising the pressure in the supply lines may be conveniently derived from the lubricating system of the power plant as indicated hereinafter. This would be especially convenient in the case of forced feed lubricating systems now very common in which case the lubricant is normally maintained under considerable pressure. By interposing a check valve intermediate the supply lines and the reservoir and connecting the forced feed lines with the supply main in front of the check valve through an electro-magnetically operated valve actuated by an electro magnet such as 46, the pressure in the supply line could be raised for the necessary feeding-in operation just as in the case of the sylphons described. After the feeding-in operation the valve would be closed and the pressure relieved through a second valve or a second port in the same valve to the reservoir. This of course presupposes that the reservoir is at sufficient height to supply oil to the various points of application. If not a small auxiliary reservoir which is at sufficient height and which is normally supplied by lubricant by the forced feed system and has an overflow to the crank case can be used in lieu of the crank case or other reservoir 12. Instead of applying the forced feed pressure direct to the main it may be applied thru a diaphragm or through pressure reducing or raising pistons, sylphons or the like. This provision has the advantage of preventing loss of power plant lubricant in case of breakage of the chassis supply line. This loss may be further guarded against by providing a pair of normally closed contacts in the circuit of magnet 46 which are opened when the level of the fluid in the crank cases is lowered below a certain minimum or when the pressure of the feed falls below a certain minimum so that no further feeding can take place.

14. The feeding-in devices. These devices instead of being pumps of the univalve type may be pumps of the bivalve type which is to say they are provided with both inlet and discharge valves. Or they may be provided with certain auxiliary valves of the form very commonly known in hydraulic and air brakes. In such case the feeding-in pump itself may be constituted in the form most efficiently making use of the piston and valve system employed. Further the feeding-in device in the case of bearings requiring only low pressure lubrication may indeed be but a valve which valve is operated by the application of that kind of power used in the system. Still further the pump may be in the form of a pair of connected sylphons which sylphons bear to each other the relations of area and volume borne by the low and high pressure pistons of the pumps illustrated. Such a sylphon pump is illustrated in Figure 4. Further yet the pump body may be constituted by one of the bearing parts themselves as for example the stud of the shackle or the body of a bearing, the interior of which may be hollowed out to form the chambers of the pump and provide it with suitable discharge openings to the bearing surfaces on the exterior of the stud or body. In this case instead of the pump constituting the union between the supply connection and the bearing, the pump is an integral part of the bearing and union is made directly with the supply connection.

26, 27. The sylphon displacement apparatus for generating the operating pressure in the supply mains. The generation of this pressure can obviously be accomplished in many ways. Pistons and cylinders, displacement diaphragms and the innumerable other displacement devices may be substituted.

28. The intake manifold connection for operating the sylphons. Power may be derived from any available source in connection with the power plant of the car either on the admission, compression, firing or exhaust strokes of the prime mover, from the electric starting system, the lubricating system or cooling system thereof. The application of such power to the displacement devices 26 and 27 or their equivalents requires in the main only engineering skill. I have illustrated the use of electric power from the starting battery. Such electric power may be applied directly to the sylphon 26 or its equivalent by means either of a motor or an electro-magnet. Through the pressure derived from one of the strokes of the motor or from a compressed air system pressure may be applied directly to reservoir 12 with suitable application and release devices. Given the idea of application of power and its release from the mains, and the means of governing it automatically or manually, there exists in the art means of its accomplishment from most if not all known sources of power or combinations of the same.

38. The speedometer control mechanism. The electrical control should obviously be built into the regularly provided speedometer of the car to avoid duplication. On existing cars however an auxiliary speedometer mechanism may be provided which will be considerably cheaper in first cost in installation than the regular speedometer. The ordinary speed counter mechanism connected with the wheels or transmission of the chassis and provided with the necessary contacts will be sufficient. It occupies but small space and may be placed at any convenient point. Even connecting the speedometer mechanism with the prime mover will enable one to practice the method by giving an approximation in error only by the extra operation of starting and stopping and clutch slippage. Regarding these as constant for a given time the approximation will be fairly close.

39–46. The electrical control system. Instead of one energization for each actual circuit closure by the speedometer mechanism, a multiple number may be provided for by connecting an intermittent circuit closer in the circuit of magnet 46 to any convenient source of power, either of the power plant or of the vehicle. Or a vibrating device may be used, as for example a vibrating electro magnet. This will give the bearings a number of "shots" of lubricant at the end of each period instead of one "shot" as illustrated.

Such a course would enable one to use smaller needle pistons and expand less power per "shot", or conversely to generate a higher feeding-in pressure by feeding in a small quantity at a time. Further some bearings may require feeding at different intervals from other bearings and such bearings may be connected on a special circuit control from special speedometer actuated contacts. Still further to equalize the load on the power plant or its component the storage battery or starting generator, certain groups of the bearings may be successively operated by an arrangement of control devices successively operated from any suitable source of power. The organization of the relay control 45, 46 is too susceptible of many modifications to obtain greater certainty and reliability of operation. I contemplate applying any of the devices well known in the art. But instead of having the speedometer mechanism accomplish the final opening of the energizing circuit, this may be accomplished through operation of the magnet 46 or any of the series of apparatus which it controls, according to principles well known in the art.

47, 48, 51. Manual control may be separated from the starting switch of the power plant if desired.

63. The electric circuits of 63 may be combined with the supply connections, the metallic supply connection being made to constitute one branch of the electric circuit. The other branch may be housed within the supply connection itself whereby the supply connection not only transmits lubricant but constitutes armored casing for the other branch of the electric circuit. Or both branches may be comprehended within the supply connection and protected by it.

Figure 5:
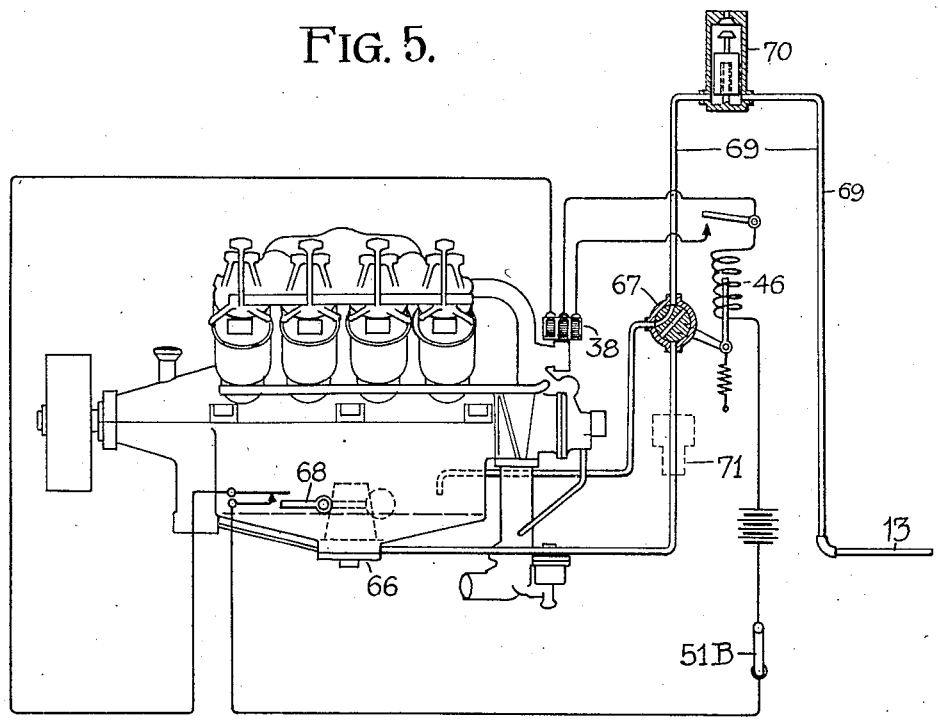
Fig. 5 is a diagram of a further modified system.

Finally there is a modified system of Fig. 5 in which the power for the operation of the system is derived from the lubricating system of the power plant, and this system not only supplies this power but also supplies the lubricant for the chassis lubricating system. Elements of the same nature as those of the systems of Figures 2 and 3 bear the same reference numerals, and the feeding-in devices connected with the supply mains are for the sake of brevity omitted. They are intended to be of the type of Figures 2 or 4.

66. The lubricant pressure feed pump of the power plant. This pump is connected with supply lines 13 to supply lubricant under pressure thereto.

67. A three-way cock or its equivalent through which lubricant is supplied from the pressure pump 66 to the lines 13 and through which lines 13 are opened to the crank case of the motor. Electromagnet 46 controlled from speedometer 38 driven in this case by the motor itself thus controls this valve 67 in a manner entirely similar to the control of valves 29 and 30 of Fig. 2, except that relay 45 is omitted and magnet 46 carries its own locking contact as shown. Obviously the relay 45 may be used if desired.

68. Normally closed contacts controlled by the level of the lubricant in the crank case reservoir in such manner that if the level falls below a certain minimum the contacts are opened. These contacts are in the circuit of magnet 46.

69. A vertical bight or loop in supply main 13 of such height as to develop a head which will keep supply main 13 and all laterals full of lubricant even when the vehicle is on a heavy grade and to act as a sort of auxiliary reservoir by the amount of lubricant contained in that branch of the loop adjoining the mains.

70. A float operated air relief valve at the top of the loop so arranged that any air or gas reaching the top of the loop from the mains 13 on the one hand or from the pump or crank case on the other hand is vented to atmosphere, but when lubricant rises in the body of the valve the float closes it so that lubricant may not be discharged through the vent.

71. A pressure raising or reducing valve to be located at any point between pump 66 and main 13.

In operation once for each predetermined number of revolutions of the motor, circuit of magnet 46 is closed through speedometer contacts 38 similar to those shown in Fig. 2, and lubricant under pressure which normally is supplied only to bearings of the motor is supplied through valve 67 to supply lines 13. Valve 67 in this operation having cut off the opening to the crank case, pressure in the mains rises, valve 70 having closed promptly when lubricant reached it, and each and every feeding-in device 14 connected with the mains and laterals is operated to give its bearing a "shot" of lubricant. In any case where the pressure of the motor lubricant is adjudged too high for general application to the main 13, pressure reducing valve 71 is inserted at any desired point. After a suitable elapsed time, as measured by a certain number of additional revolutions of the motor, speedometer 38 opens the locking circuit of magnet 46 in the manner described in Fig. 2. Thereupon valve 67 cuts off lubricant from main 13 and opens the main to the crank case. That lubricant which is contained in the bight between the air relief valve 70 and the crank case and all extra lubricant pumped into the mains 13 in the operation of feeding-in devices 14 is promptly returned to the crank case, with the exception of that amount necessary to again fill the feeding-in devices. Thus the pump which applies the pressure to the main also supplies the lubricant to be fed into the bearings, and in the respect that the loop 69 holds a portion of this lubricant so supplied it constitutes an auxiliary reservoir. If at any time there should occur a break in the main 13, and during the feeding-in operation sufficient lubricant should escape to lower the level in the crank case, float operated switch 68 opens the circuit of magnet 46 and thus restores the motor lubrication to its normal operating condition. In lieu of float operated switch 68 a pressure operated switch opening when the pressure of the motor lubricant falls below a certain minimum may be used, or both of these devices may be used.

The advantages of this system are that it is simpler than either of the systems described in Figures 2 and 3, that it is more economical in that a goodly part of the crank case lubricant ordinarily wasted in renewals is used for lubricating the chassis, and that there is but one reservoir for lubricant for the entire vehicle, that reservoir being the motor crank case. The crank case supply must be maintained and therefore as long as the motor is in operating condition the chassis will be properly lubricated.

In filling the mains of the system, any suitable means of eliminating air may be adopted. For example the unions to the various pumps may be disconnected one by one and the air allowed to escape until lubricant appears and they may then be connected either before or after the pump has been connected to the bearing. Or else a small vent opening can be used and thereafter closed by a small screw or cap. The same method can be pursued in insuring the filling of the several syphons or other displacement devices, and at any points in the line where air pockets may possibly occur.

The pumps 14 may be individually manually operated by the simple expedient of providing extensions from the pistons exteriorly of the casing, using suitable packings or glands when necessary. Where such provision is made, the central operating devices may be omitted altogether and the oiling of the car accomplished by visiting one bearing after another and giving each piston extension a push with the thumb or the palm of the hand.

Where the central operating system is used it may be found desirable to locate the displacement device for raising the pressure in the mains, as for example the sylphon or pump, within the supply reservoir itself. This will eliminate some possible sources of leakage as is well known. In the case of a central reservoir located under the dash, the pump may be located in the reservoir and have a plunger projected through the rear wall of the tank by means of a suitable gland and extended through the dashboard to a suitable push knob or other hand gripping device for convenient operation.

The system of my invention is especially adapted, I believe, for the lubrication of the springs of the car, through application of a feeding-in device 14 of suitable size commonly to a sheaf of springs, the device being applied to the mouth of a transverse drill hole which extends through all but the lower spring. Obviously the feeding-in devices 14 may have their feeding-in high pressure pistons of any suitable size for this purpose. As heretofore stated it is contemplated that the size of the piston will be varied in accordance with the requirement of the bearing and it is equally obvious that not only the size of the pistons but the type of feeding-in pump may be also varied in accordance with the character of the lubricant being fed to the bearing. Such adjustments will be quite obvious to those skilled in the art.

All of these and other modifications in the generic spirit of my invention I intend to cover in the annexed claims.

What I claim in this case is:—

1. A lubricating system for an automobile chassis comprising a lubricant feeding-in device individual to each bearing of the chassis and adapted to measure the lubricant fed-in, means measuring the distance run by the chassis, control connections between said distance measuring means and the feeding-in devices determining the period between lubrications, and separately controllable means determining the amount of lubricant so fed.

2. A lubricating system for lubricating vehicle bearings comprising a bearing to be lubricated, a remote supply reservoir connected therewith and supplying lubricant thereto under relatively low pressure, and a pressure converting device local to the bearing and responsive to change in the low pressure of the supply to convert the same into a relatively high feeding-in pressure, said pressure converting device being automatically operated by a vehicle distance measuring device.

3. A lubricating system comprising a bearing to be lubricated, a remote supply reservoir connected therewith and supplying lubricant thereto under relatively low pressure, and a high pressure feeding-in pump local to the bearing, said pump always being under a low pressure lubricant head, the changes in said low pressure head being made at periodical intervals and for predetermined distances.

4. A lubricating system comprising a bearing to be lubricated, a lubricant supply reservoir connected therewith, a feeding-in contol device, and a speedometer governing said control device, said control device comprising a high pressure cylinder, a low pressure cylinder, and means permitting the transfer of fluid from the low pressure cylinder into the high pressure cylinder, whereby it may be fed into the bearing under high pressure.

5. In a motor vehicle in combination, a power plant, a lubricating system, and separate cut-on and cut-off means for each said plant and said system, which cut-on and cut-off means are connected together for simultaneous operation, and a manual control to increase the amount of feed.

6. A lubricating system for the chassis of a vehicle comprising a lubricant feeding-in device individual to each bearing of the chassis, the speedometer measuring continuously the distance run by the vehicle and speedometer operated means actuated at intervals of equal distances run controlling the operation of said feeding-in devices.

7. In a motor vehicle in combination, a power plant, a lubricating system embodying devices to feed bearings, and separate cut-on and cut-off means for each said plant and said system, which cut-on and cut-off means are associated together for simultaneous operation, and a manual control to increase the amount of feed.

8. A lubricating system for vehicles comprising a bearing to be lubricated, a feeding-in control device for the lubricant supplied to said bearing, a speedometer indicating the distance traveled by said vehicle in miles, an electrical control circuit governing said feeding-in device and opened and closed by said speedometer.

9. A lubricating system for vehicles comprising a bearing to be lubricated, a feeding-in control device for said bearing, a standard indicating speedometer connected to indicate the distance traveled by said vehicle, and control connections between the indicating mechanism of said speedometer and the feeding-in device including the indicating mechanism.

10. A lubricating system for vehicles, comprising a recording speedometer, recording the distance traveled by the vehicle in miles, a bearing to be lubricated, and a lubricant feeding-in control device for said bearing controlled from said recording mechanism by means including said recording mechanism.

11. A lubricating system for vehicles comprising a bearing to be lubricated, a lubricant feeding-in control device for said bearing, a recording speedometer recording the distance traveled, a mechanism including a number of digitally related recording elements, a cut-on control for said feeding-in device governed by a recording element of one digital order, and a cut-off control for said feeding-in device, governed from a recording element of a different digital order.

12. A lubricating system for vehicles comprising a bearing to be lubricated, a lubricant feeding-in control device for said bearing, a distance-recording device connected with a vehicle to record the distance run, an electrical control circuit for said feeding-in device arranged to be closed at intervals by said distance-recording device and locking means for said electrical circuit governed jointly by said circuit and said recording device.

13. A lubricating system for vehicles comprising a bearing to be lubricated, a feeding-in control device, a recording device connected to record the distance run by said vehicle, comprising a number of digitally related recording elements, an electrical control circuit for said feeding-in device closed from one of said elements, and a locking circuit for said electrical control circuit normally closed through energization of said circuit but adapted to be opened at another of said recording elements.

14. A lubricating system for vehicles comprising a bearing to be lubricated, a lubricant feeding-in control device actuated by changes in pressure in supply of lubricant to said device, means to supply the lubricant and control means therefor, means for recording the distance run, and electrical control circuits between said distance recording means and said lubricant supply control means.

15. A lubricating system for vehicles comprising a bearing to be lubricated, means of lubricant supply thereto, a high pressure feeding-in control device local to the bearing and governed by change in pressure of its lubricant supply, a power-plant for the vehicle supplying power to change the pressure of said supply, and a distance run recording device governing the application of said power.

16. A lubricant supply system and bearing to be lubricated, a lubricant feeding-in device therefor governed by changes of pressure in the lubricant supply, a lubricant supply tank connected thereto through a check valve, means to raise the pressure of the supply between the check valve and the feeding-in control device to cause the device to feed lubricant into said bearing, and a pressure-controlled by-pass around the check valve.

17. A chassis lubrication system comprising a bearing to be lubricated, a feeding-in control device, a distance-run recording device, an electrical control circuit for said feeding-in device governed by said recording device and a manually operated switch also governing said control circuits.

18. A chassis lubricating system comprising a bearing to be lubricated, a feeding-in control device operated on one stroke by flow of lubricant into the device to feed lubricant into the bearing and on the return stroke effecting a return flow of lubricant not so fed, means to supply lubricant under pressure to operate said feeding-in control device and to supply it with lubricant to be fed, a lubricant supply reservoir and additional means permitting the return flow of lubricant to enter said reservoir.

19. A feeding-in control device comprising a lubricant-cup having a reduced shank adapted to be threaded directly into the part to be lubricated, a feeding-in pump in the shank itself having a piston extending through a packed opening into the body of the cup, an operating piston connected with the pump piston and reciprocating in the cup retracting means between the piston and the bottom of the cup, the cup having an aperture connecting the space occupied by the said retracting means to atmosphere, and means to supply lubricant under pressure both to said pump and to said operating piston.

20. A chassis lubricating system comprising a bearing to be lubricated, a lubricating system for the power-plant of the vehicle and means to supply a lubricant from the power plant to the bearing, comprising a conduit having a vertical riser of a height developing a gravitational head sufficient to maintain the supply of lubricant irrespective of the inclination of the vehicle.

21. A chassis lubricating system comprising a bearing to be lubricated, a power-plant lubricating system for the vehicle, and means connecting it with the bearing to be lubricated comprising a conduit having a vertically extending loop and an air-venting valve at the top of said loop.

22. A chassis lubricating system comprising a bearing to be lubricated, a power plant lubricating system for the vehicle, and means connecting it with the bearing to be lubricated, comprising a conduit having a vertically extending loop and a float controlled air-venting valve at the top of said loop.

23. A lubricating system for vehicles comprising a bearing to be lubricated, a feeding-in control device operated by changes in the pressure of lubricant supply, a forced-feed lubricating system for the power-plant of the vehicle, a conduit connecting the same with the feeding-in control device and a valve means connected with said conduit to positively admit pressure from the said forced feed system and positively release the pressure so applied.

24. A chassis lubricating system comprising a bearing to be lubricated, a power-plant lubricating system from which said bearing is supplied, and means controlled by the quantity of lubricant in said power-plant system interrupting the supply of lubricant to the bearing.

25. A chassis lubricating system comprising a plurality of bearings to be lubricated, feeding-in control devices local to the bearings, a forced-feed lubricating system for the power plant, a conduit from the pressure side of said forced-feed system extending in common to said feeding-in control devices to effect an actuation of the same, a reservoir in connection to the forced-feed system at such elevation as to maintain the system filled with lubricant on the bearing side of the reservoir irrespective of the inclination of the vehicle and of the connection to the forced-feed system to the reservoir, and a two-way valve controlling the connection of the reservoir with the forced-feed system, in one position applying the forced-feed thereto and in the other position establishing an overflow to relieve the applied pressure.

26. A feeding-in control device comprising a lubricant-cup having a reduced shank adapted to be threaded directly into the part to be lubricated, a lubricant pump in the said threaded shank having an operating piston extending into the chamber of said cup, and electro-magnetic operating means housed within the chamber of said cup.

27. A feeding-in control device comprising lubricant-cup provided with a reduced shank adapted to be threaded directly into the part to be lubricated, a lubricant pump in said shank having a piston extending within the body of the cup, centrally re-entrant walls extending toward each other from the top and bottom of said cup, an armature guided by said walls connected with said piston to actuate the same, and an electromagnet surrounding said walls and operating upon said armature.

28. A feeding-in control device comprising a lubricant-cup adapted to be threaded directly into the bearing to be lubricated, a sylphon pump in the bearing end of said cup and a sylphon operating member for said pump in the opposite end of said cup.

29. A feeding-in control device for bearings, comprising a low-pressure sylphon motor device operating a high pressure sylphon feeding-in device.

30. A feeding-in control device comprising a low-pressure sylphon operating device and a high pressure sylphon pump operated thereby to feed the lubricant under high pressure to the bearing and receiving its lubricant from the low-pressure sylphon.

31. A feeding-in control device comprising a cup-shaped casing adapted to be threaded directly to the part to be lubricated and a pair of sylphons arranged in said casing in series, the one of which is operative upon application of pressure thereto to actuate the other to feed lubricant under pressure to the bearing.

32. A lubricating system for automobiles, or the like, comprising a chassis provided with a plurality of lubricating points, an oil reservoir, an oil pump having an inlet connected with said oil reservoir and an outlet communicating with said plurality of lubricating points, a motor actuated by the suction of the automobile engine operating said oil pump, and electrical means operated by the driving gear of the automobile for periodically controlling the actuation of said motor to operate said pump and supply oil to said plurality of lubricating points.

In testimony whereof he hereunto affixes his signature.

JOHN P. TARBOX.